(12) United States Patent
Fehrenbach et al.

(10) Patent No.: US 10,044,094 B2
(45) Date of Patent: Aug. 7, 2018

(54) LEVEL INDICATOR COMPRISING AN ENERGY TRANSMISSION DEVICE

(71) Applicant: VEGA GRIESHABER KG, Wolfach (DE)

(72) Inventors: Josef Fehrenbach, Haslach (DE); Roland Welle, Hausach (DE); Levin Dieterle, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 15/120,466

(22) PCT Filed: Feb. 21, 2014

(86) PCT No.: PCT/EP2014/053433
§ 371 (c)(1),
(2) Date: Aug. 19, 2016

(87) PCT Pub. No.: WO2015/124202
PCT Pub. Date: Aug. 27, 2015

(65) Prior Publication Data
US 2017/0069951 A1    Mar. 9, 2017

(51) Int. Cl.
*H01Q 1/22* (2006.01)
*G01F 23/284* (2006.01)
(Continued)

(52) U.S. Cl.
CPC ............ *H01Q 1/225* (2013.01); *G01B 15/04* (2013.01); *G01F 23/284* (2013.01);
(Continued)

(58) Field of Classification Search
None
See application file for complete search history.

(56) References Cited

U.S. PATENT DOCUMENTS 2,894,220 A    7/1959 Ridgers et al.
8,198,755 B2   6/2012 Seefried et al.
(Continued)

FOREIGN PATENT DOCUMENTS

DE    100 12 981 A1    9/2001
DE    101 49 851 A1    4/2003
(Continued)

OTHER PUBLICATIONS

International Search Report dated Nov. 25, 2014 in PCT/EP2014/053433 filed Feb. 21, 2014.
(Continued)

*Primary Examiner* — Edwin Gunberg
(74) *Attorney, Agent, or Firm* — Oblon, McClelland, Maier & Neustadt, L.L.P.

(57) ABSTRACT

A fill level measurement device for determining a topology of a surface of a filling material or of a bulk material is provided, including a rotatable antenna including an array of radiator elements configured to emit a measurement signal towards the surface and to receive a reflected measurement signal reflected from the surface, and a high-frequency signal processor configured to generate the measurement signal and to at least partially process the received reflected measurement signal; and a power supply and communications circuitry, coupled to the high-frequency signal processor by a sliding contact or a pair of coils, and configured to supply the high-frequency signal processor with electrical power for measurement operation.

11 Claims, 6 Drawing Sheets

(51) Int. Cl.
  *H01Q 3/06* (2006.01)
  *H04B 17/10* (2015.01)
  *G01B 15/04* (2006.01)

(52) U.S. Cl.
  CPC ............ *H01Q 1/2291* (2013.01); *H01Q 3/06* (2013.01); *H04B 17/103* (2015.01)

(56) References Cited

U.S. PATENT DOCUMENTS

| | | | |
|---|---|---|---|
| 2002/0027347 A1* | 3/2002 | Fujita | B60R 21/01 280/735 |
| 2004/0031335 A1* | 2/2004 | Fromme | G01B 11/24 73/865 |
| 2004/0108951 A1 | 6/2004 | Edvardsson et al. | |
| 2010/0019952 A1 | 1/2010 | Poussin | |
| 2010/0188296 A1 | 7/2010 | Gard | |

FOREIGN PATENT DOCUMENTS

| | | |
|---|---|---|
| DE | 10 2004 041 857 A1 | 3/2006 |
| EP | 2 083 407 A1 | 7/2009 |
| EP | 2 363 694 A1 | 9/2011 |
| FR | 2 907 546 A1 | 4/2008 |
| GB | 788670 | 1/1958 |
| WO | WO 03/034004 A1 | 4/2003 |
| WO | WO 2008/047050 A1 | 4/2008 |

OTHER PUBLICATIONS

International Preliminary Report of Patentability and Written Opinion dated Sep. 1, 2016 in PCT/EP2014/053433 (English translation only).

Taiwanese Search Report dated Apr. 11, 2018 in Taiwanese Application No. 104105698 (English Translation). 1 page.

* cited by examiner

LEVEL INDICATOR COMPRISING AN ENERGY TRANSMISSION DEVICE

FIELD OF THE INVENTION

The invention relates to fill level measurement. The invention relates in particular to a fill level measurement device for determining the topology of a surface of a filling material or bulk material, to the use of a fill level measurement device for determining a viscosity or density of a moving liquid, and to the use of a fill level measurement device for determining a mass flow of a bulk material on a conveyor belt.

BACKGROUND

Measurement devices which are used for example in the field of monitoring objects or monitoring bulk material emit electromagnetic waves or ultrasound waves in the form of a transmission signal, for example, which are reflected at least in part from the filling material surface or the corresponding object. The transmission signal (also referred to as the "measurement signal") which is reflected at least in part can then be received by the antenna unit of the measurement device and analysed by the electronics connected thereto.

By scanning over the surface of the filling material or object, it is possible to determine the topology of the filling material surface or the object, respectively. In the field of fill level measurement, "topology" is understood to mean the shape of the surface of the filling material or bulk material. In this context, the term "topography" can also be used.

In order to supply the measurement devices with electrical power and transmit the obtained data to an external device, the measurement devices can be equipped with what is referred to as a "four-wire interface". In an alternative configuration, such measurement devices can also be equipped with what is referred to as a "two-wire interface" (4-20 mA interface).

In order to detect the topology of the filling material surface, it is possible to make the entire fill level measurement device (for example a radar level indicator) rotate. It is also possible to make just the transmitting and/or receiving unit, referred to in the following as the "antenna unit", rotate. In this case, the transmission signal can be transmitted from the high-frequency unit, located in the housing of the fill level measurement device, to the antenna unit by means of a waveguide.

SUMMARY OF THE INVENTION

An object of the invention is to provide an alternative fill level measurement device for detecting a topology of a filling material surface or bulk material surface by means of a rotating antenna.

This object is achieved by the features of the independent claims. Developments of the invention may be taken from the dependent claims and from the following description.

A first aspect of the invention relates to a fill level measurement device for determining the topology of a surface of a filling material or bulk material. The fill level measurement device comprises a rotatable antenna unit. An arrangement (an array) of radiator elements or antenna elements or individual antennae is located on the antenna unit, which elements or antennae are used to emit a measurement signal towards the filling material surface and/or to receive the measurement signal reflected from the filling material surface (received signal). The radiator elements of the array can be arranged in one plane which encloses an angle $\alpha$ other than 90° with the rotational axis of the antenna unit for example. The angle $\alpha$ is for example between 30 and 60°, for example 45°.

In order for there to be an angle $\alpha$ of other than 90° to the perpendicular direct connection line between the antenna and the filling material surface, the measuring range of the antenna can be widened. As a result of the measuring range being widened, the topology of the filling material surface can be measured over a large region and the detection of the fill level can be of a high quality.

The rotational axis of the antenna unit can be a vertical rotational axis for example, if the antenna unit is fitted, together with the fill level measurement device, in or on a container containing the filling material.

The radiator elements are for example substantially two-dimensional flat patches. The radiator elements may also be provided in the form of radiators that have been designed in a different manner.

The array is for example a one-dimensional array comprising a plurality of individual columns of radiator elements. However, the array can also be a two-dimensional array having a plurality of parallel columns and a plurality of rows arranged perpendicularly thereto which are each made up of the individual radiator elements.

In order to measure the topology of the filling material surface or bulk material surface, the antenna unit can be caused to rotate. A high-frequency and signal processing unit is provided, which is attached to the rotatable antenna unit and is used to generate the measurement signal and process the received reflected measurement signal (received signal) at least in part. Therefore, this signal (pre)processing occurs directly at the antenna unit. The high-frequency and signal processing unit therefore rotates with the antenna device when said antenna unit is caused to rotate in order to take the topology measurement.

A power supply and communications unit is also provided, which is arranged in the stationary region of the fill level measurement device and therefore does not rotate together with the antenna unit. The power supply and communications unit comprises one or more sliding contacts and/or one or more pairs of coils which couple the power supply and communications unit to the high-frequency and signal processing unit in order to supply said high-frequency and signal processing unit with the electrical power required for the measurement operation.

Data may also be transmitted from the high-frequency and signal processing unit to the power supply and communications unit by means of this/these interface/s.

The high-frequency and signal processing unit is for example integrated in the antenna unit.

According to a further embodiment of the invention, the fill level measurement device comprises a power supply and communications interface for connecting the power supply and communications unit to a two-wire line, by means of which it is possible to supply the fill level measurement device with the power required for the measurement operation and by means of which measurement data can be transmitted to a remote control unit.

The fill level measurement device draws the power it requires for measuring and for rotating the antenna solely by means of the two-wire connection, which is also designed to communicate with the control unit, in particular to emit at least one topology measured value or at least one measured value derived therefrom (for example the mass in the container).

According to a further embodiment of the invention, the fill level measurement device comprises a first stator-rotor pair of coils which is designed for wirelessly transmitting the power required for the measurement operation from the power supply and communications unit to the antenna apparatus. In other words, the electrical power can be transmitted wirelessly. This is advantageous since the antenna apparatus is intended to rotate relative to the main body of the fill level measurement device when the measurement is being taken.

According to a further embodiment of the invention, the fill level measurement device comprises a second stator-rotor pair of coils for wirelessly transmitting the measurement signals received by the antenna unit and processed by the high-frequency and signal processing unit from the high-frequency and signal processing unit to the power supply and communications unit. Sliding contacts are therefore not necessary.

A sliding contact can also be provided as an alternative to or in addition to each of the first and/or second stator-rotor pairs of coils.

According to a further embodiment of the invention, the fill level measurement device comprises a rotary encoder for determining the angle of rotation of the antenna unit.

For example an electric motor is provided for rotating the antenna unit while the measurement signal is being emitted, the rotary encoder, the first sliding contact or the first pair of coils and the electric motor being arranged on a common rotational axis.

According to a further embodiment of the invention, the fill level measurement device comprises a wireless close-range communications apparatus which is attached to the high-frequency and signal processing unit and is designed to transmit the measurement data generated by the high-frequency and signal processing unit.

According to a further embodiment of the invention, the sliding contact or the pair of coils is designed to transmit power to the high-frequency and signal processing unit and to transmit data from the high-frequency and signal processing unit to the power supply and communications unit.

In this case, time-division multiplexing or a suitable method for signal transformation (modulation) is provided in order to transmit both data and power.

A further aspect of the invention specifies the use of a fill level measurement device as described above and below for determining further physical characteristic values of a moving liquid. For example, the viscosity and/or density of the moving liquid can be determined from the topology of the liquid surface when the container geometry is known and when moving at a relatively high speed.

A further aspect of the invention specifies the use of a fill level measurement device as described above and below for determining a mass flow of a bulk material on a conveyor belt.

A further aspect of the invention specifies a method for determining the topology of a surface of a filling material or bulk material. First, an antenna unit is supplied with the electrical power required for the measurement operation by means of a power supply and communications unit which is coupled to the antenna unit by means of a sliding contact or a pair of coils. For measurement purposes, the antenna unit is rotated and the measurement signal is generated by a high-frequency and signal processing unit of the antenna unit. This measurement signal is then emitted towards a filling material surface or bulk material surface and the measurement signal reflected from said surface is then received by the antenna unit once again. To this end, the antenna unit comprises an array of radiator elements. In a further step, the received reflected measurement signal is processed at least in part by the high-frequency and signal processing unit of the rotating antenna unit.

Different radiator elements may be used for emitting the measurement signal and for receiving the reflected measurement signal. However, some of the radiator elements or all of the radiator elements may also be set up to emit the measurement signal and to receive the measurement signal.

The processed measurement signal can then be transmitted to the power supply and communications unit of the measurement device in a wireless or wired manner.

Said power supply and communications unit can then process the data further and transmit the data to a remote control unit by means of a two-wire line, by means of which the power required for the measurement operation is also transmitted.

Therefore, a combination of power transmission, angle detection, rotational driving and data transmission can be ensured in the rotatable sensor unit (antenna unit), the electronic units required therefor being distributed between the stationary part of the device and the rotating part of the device.

Therefore, the fill level measurement device can comprise on the rotating device unit a rotating antenna comprising a partial electronics unit used for the fill level measurement, and additional units for transmitting power and information between the stationary part and the rotating part.

Embodiments of the invention are described below with reference to the figures.

DETAILED DESCRIPTION OF EMBODIMENTS

The drawings in the figures are schematic and not to scale.

Where the same reference signs are used in different figures in the following description of the figures, they denote the same or similar elements. The same or similar elements may also be denoted by different reference signs, however.

The present invention can be used in conjunction with fill level measurement devices which comprise at least one transmitting and/or receiving unit, referred to in the following as the "antenna unit", which mechanically rotates about one or more axes while a measurement is being taken. In this respect, particular interest is placed on radar level indicators that record echo curves from different directions in space in the container by the transmitting and/or receiving unit rotating mechanically and calculate the course (topology) of the surface of the filling material in the container from characteristic values derived from said echo curves. The topology can be output directly by the measurement device or converted into a further characteristic value, for example the volume contained in the container or the mass of filling material contained in the container.

Figure 1:
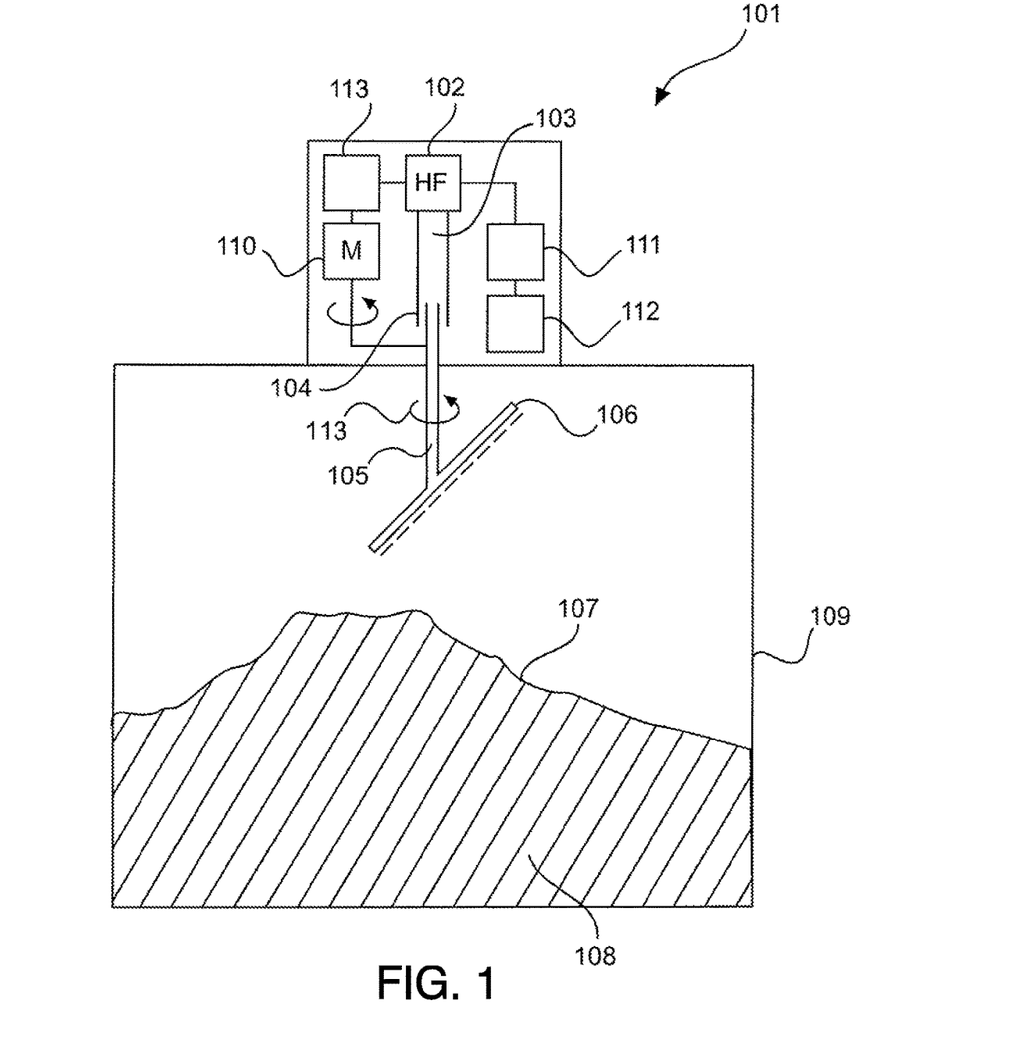
FIG. 1 shows a fill level measurement device comprising a rotatable antenna.

FIG. 1 shows a fill level measurement device 101 which records a representation of the reflectance in the container 109 by emitting an electromagnetic or acoustic signal towards a filling material surface 107 of a filling material 108. In particular, the fill level measurement device can calculate the topology of the filling material surface from the measurement signal reflected from the surface.

The measurement device 101 comprises a high-frequency unit 102, for example, which couples high-frequency signals, for example in the range of 79 GHz, into a waveguide 103. A rotary coupler 104 is connected to the waveguide 103 and forwards the microwave signals into a second waveguide 105 which can rotate relative to the first waveguide 103.

The second waveguide can be rigidly connected to at least one transmitting and/or receiving apparatus, for example a planar antenna 106, which emits the microwave signals towards the surface 107 of the medium 108 in the container 109 and/or receives said signals therefrom.

The combination, which can rotate relative to the container 109, consisting of the second waveguide 105 and antenna 106 is caused to rotate by a motor 110 for example. This means that it is possible to record a plurality of echo curves from different angular directions of the container. In order to generate a digital representation of the topology of the surface 107 of the medium from the measured echo curves, the signal processing unit 111 required for this purpose needs to have the absolute angle of rotation 113 of the antenna unit 106 relative to the container 109 that is associated with each of the recorded echo curves.

The angle of rotation can be detected by a rotary encoder 112 and then provided to the signal processing unit 111.

The signal processing unit can be connected by means of a connection (not shown) to a power supply and communications unit 113 which externally provides one or more measured values or characteristic values derived therefrom, for example by means of a 4-20 mA current interface and/or by digital communication. The power supply and communications unit 113 may also have a four-wire interface, by means of which the measuring device 101 is supplied with power and by means of which the measurement device 101 externally provides one or more measured values or characteristic values derived therefrom.

The rotary coupler can for example be produced in a relatively economical manner for low frequencies, for example in the range of 6 GHz or 24 GHz, since, in this case, the precision of the mechanical construction to be met in the process tends to be low owing to the long wavelengths of the signals. For high frequencies, for example for signals in the range of 79 GHz, the requirements placed on the mechanical construction of the rotary coupler are sometimes significantly higher. Furthermore, in the context of process measurement technology, greater requirements are to be expected for the operating temperature of the fill level measurement device, and these are difficult to satisfy using a rotary coupler when combined with the low tolerances of the mechanics.

Figure 2:
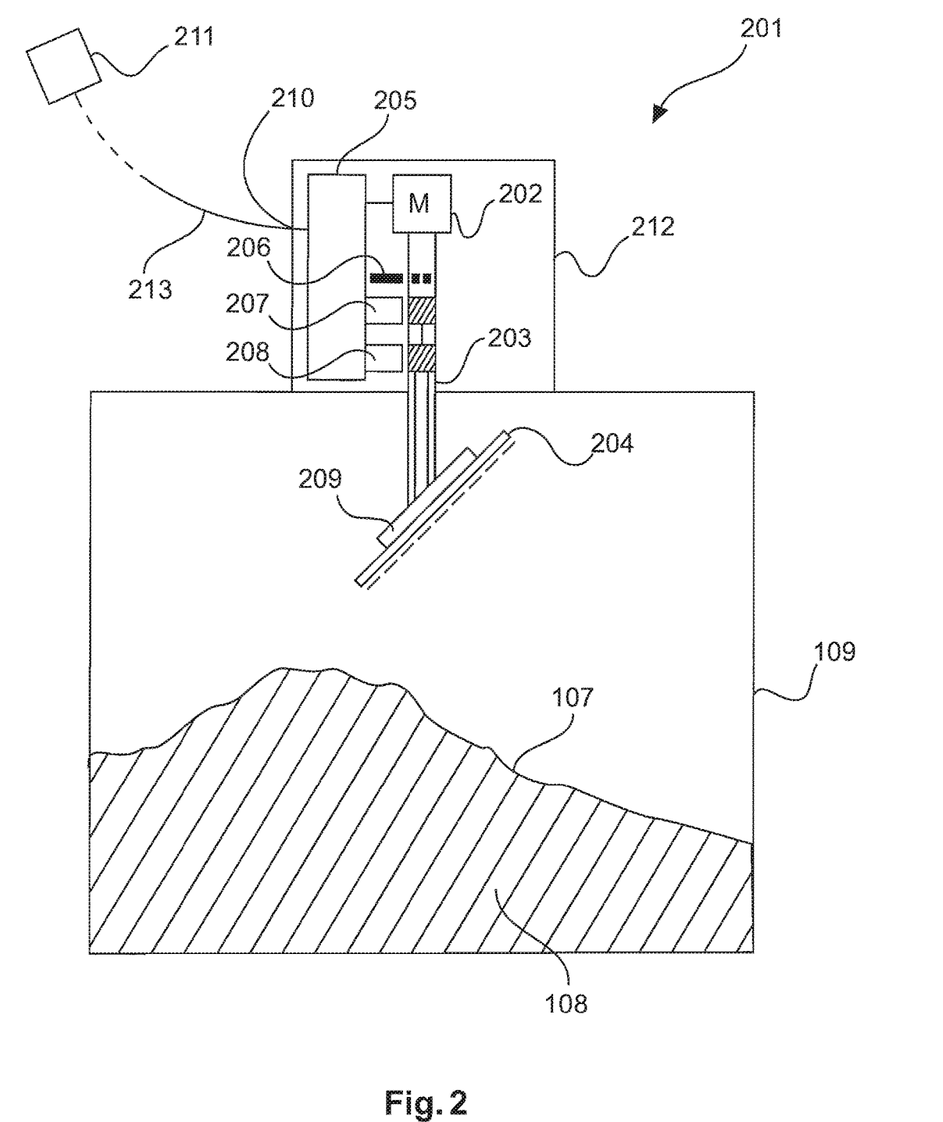
FIG. 2 shows a fill level measurement device according to one embodiment of the invention.

FIG. 2 shows a first example of a fill level measurement device according to one embodiment of the invention. The measurement device 201 comprises a main body 212 in which a motor 202 is arranged which causes a tube 203 (not necessarily a high-frequency waveguide) to rotate together with the transmitting and/or receiving unit (also referred to as the "rotatable antenna device") 204 fastened thereto.

The measurement device 201 also comprises a power supply and communications unit 205 which is connected to the motor 202, a rotary encoder 206 and two sliding contacts 207, 208. The first sliding contact 207 can be designed to transmit the electrical power required by the high-frequency and signal processing unit 209 to the rotating tube 203. The second sliding contact 208 can be designed to transmit the angle detected by the rotary encoder 206 to the signal processing unit 209.

Furthermore, the second sliding contact can be designed to transmit settings or software updates to the signal processing unit 209, which settings or software updates are fed into a 4-20 mA interface 210 by the user or a remote central unit 211 for example by digital communication via a two-wire line.

Upon completion of a measurement cycle, the high-frequency and signal processing unit 209 can use the second sliding contact 208 to transmit the detected measured values to the power supply and communications unit 205, which can provide the corresponding values externally.

It is also possible to integrate the rotary encoder 206 in the tube 203 in order to reduce the amount of data to be transmitted.

All forms of known rotary encoders can be used as the rotary encoder in the present embodiment and in the embodiments described below. In particular, a contactless rotary encoder can be used which operates in accordance with the laser principle, the inductive principle or the capacitive principle, i.e. in particular also a resolver or Hall sensor.

All forms of known electric motors can be used as the motor in the present embodiment and in the embodiments described below, i.e. in particular a DC motor, a stepping motor, a reluctance motor, a brushless DC motor, a synchronous motor or an asynchronous motor.

The control electronics of these motors can be integrated in the motor itself, or may also be contained in the fill level measurement device and, in this case, in the power supply and communications unit 205, for example. When using servomotors, it is also possible to integrate the rotary encoder 206 in the motor 202 itself.

The embodiment of FIG. 2 eliminates the need to use an expensive rotary coupler 104 since the electronics which is initially contained only in the stationary part of the fill level measurement device 101 is now transferred in part to the rotating part. In this case, it is possible to use mechanical sliding contacts 207, 208, although these have a limited service life.

Figure 3:
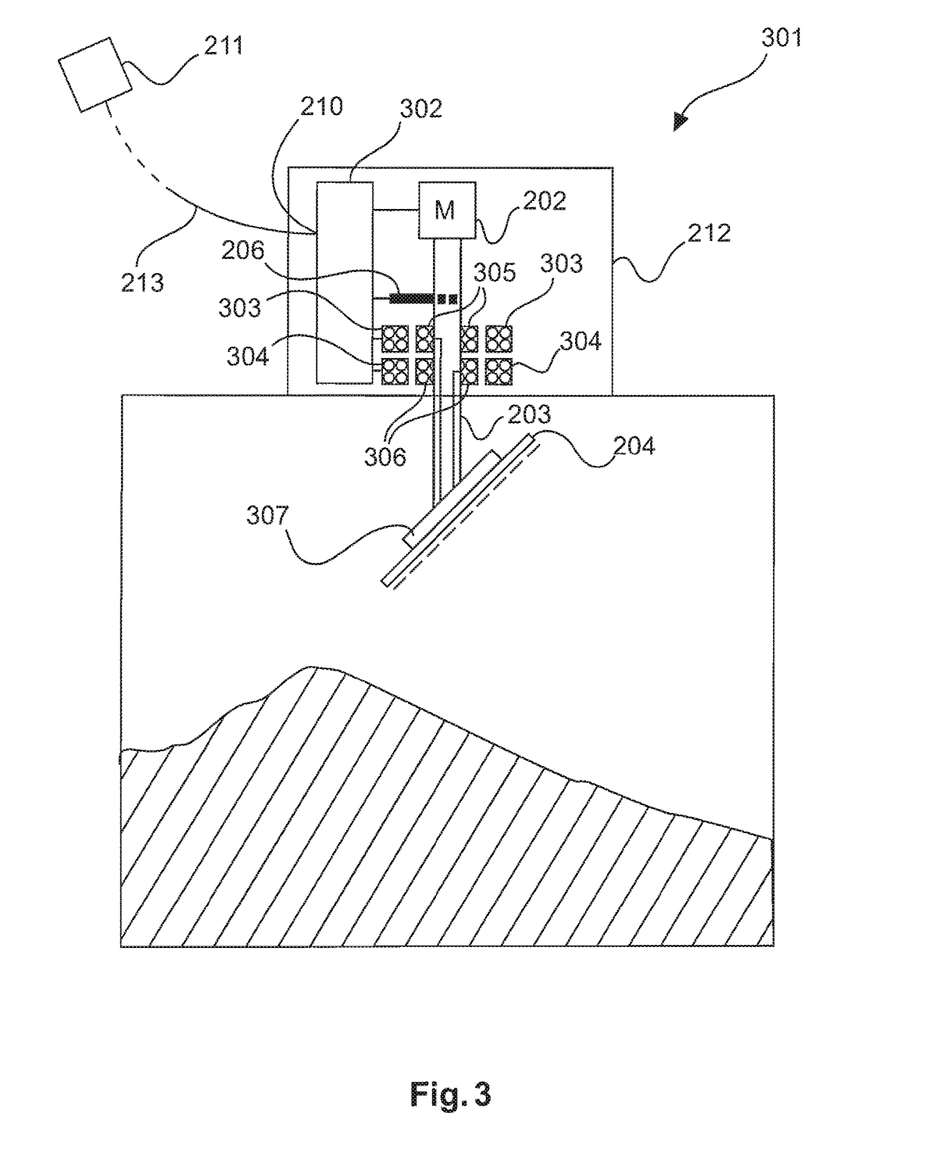
FIG. 3 shows a fill level measurement device according to another embodiment of the invention.

FIG. 3 shows a further embodiment of a measurement device which does not have this disadvantage either. The measurement device 301 comprises a modified power supply and communication unit 302 which is connected to a first annular stator coil 303 and a second annular stator coil 304.

A first rotor coil 305, which is connected to the modified high-frequency and signal processing unit 307, is located on the tube 203 driven by the motor 202, so as to be spatially close to the first stator coil 303. Furthermore, a second rotor coil 306 is located spatially close to the second stator coil 304 and is likewise connected to the high-frequency and signal processing unit 307.

The first stator-rotor pair of coils 303, 305 is used to transmit the electrical power provided by the power supply and communications unit 302 to the high-frequency and signal processing unit 307. The power supply and communications unit 302 can also actuate the first stator coil in a suitable manner. The modified high-frequency and signal processing unit 307 can contain circuit components which are suitable for generating supply voltages required for operating the high-frequency and signal processing unit 307 from the signals picked off at the first rotor coil 305.

The second stator-rotor pair of coils 304, 306 is used to transmit information (for example parameter values, settings, software updates and angular values), transmitted by the power supply and communications unit 302, to the high-frequency and signal processing unit 307. The power supply and communications unit 302 can also actuate the second stator coil in a suitable manner.

The modified high-frequency and signal processing unit 307 can contain circuit components which are suitable for extracting the transmitted information from the signals picked off at the second rotor coil 306. Furthermore, for its part, the modified high-frequency and signal processing unit 307 is also suitable for transmitting information (status information, detected measured values) by means of the second rotor coil 306 and the second stator coil 304 to the modified power supply and communications unit 302 in order to externally provide the user with said information.

At this juncture, it should be noted that the first and second stator coils can be produced in a shared unit. The same applies to the first and second rotor coils. The same unit may also be used for transmitting power and for transmitting information, for example by time-division multiplexing or a suitable method for signal transformation (modulation). The latter also applies to the embodiment shown in FIG. 2 comprising sliding contacts.

In the measurement device according to FIG. 3, time-sensitive information (e.g. the angular values of the sensor 206) can be transmitted to the signal processing unit 307 in a contactless manner. As a result of EMC interference, it may be difficult to transmit time-sensitive information in this manner.

Figure 4:
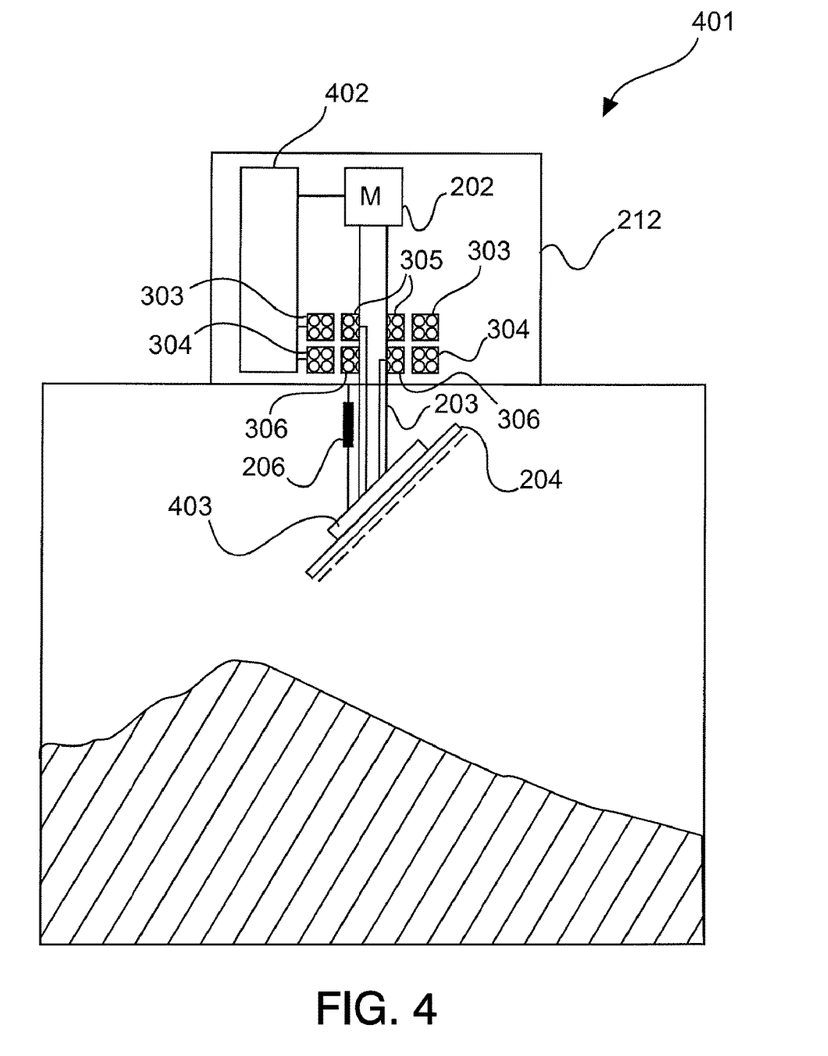
FIG. 4 shows a fill level measurement device according to another embodiment of the invention.

FIG. 4 therefore shows a further embodiment of a measurement device 401 comprising a power supply and communications unit 402. The arrangement differs from the arrangement shown in FIG. 3 in that the rotary encoder 206 is moved towards the rotating sensor part 203. The modified high-frequency and signal processing unit 403 is now directly connected to the rotary encoder 206 and inputs the actual angle of rotation herefrom. It is therefore not possible for this information to be transmitted from the non-rotating sensor part to the rotating sensor part.

Figures 5A, 5B:
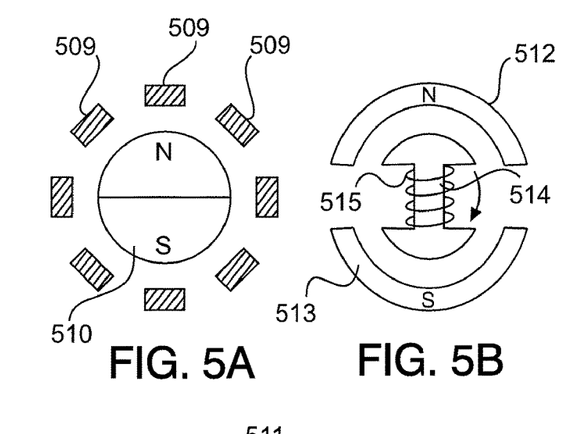
FIG. 5A shows an electric drive mechanism according to one embodiment of the invention.
FIG. 5B shows a power generation unit according to one embodiment of the invention.
Figure 5C:
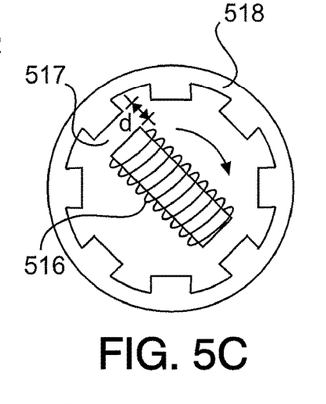
FIG. 5C shows an angle detection unit (rotary encoder) according to one embodiment of the invention.
Figure 5D:
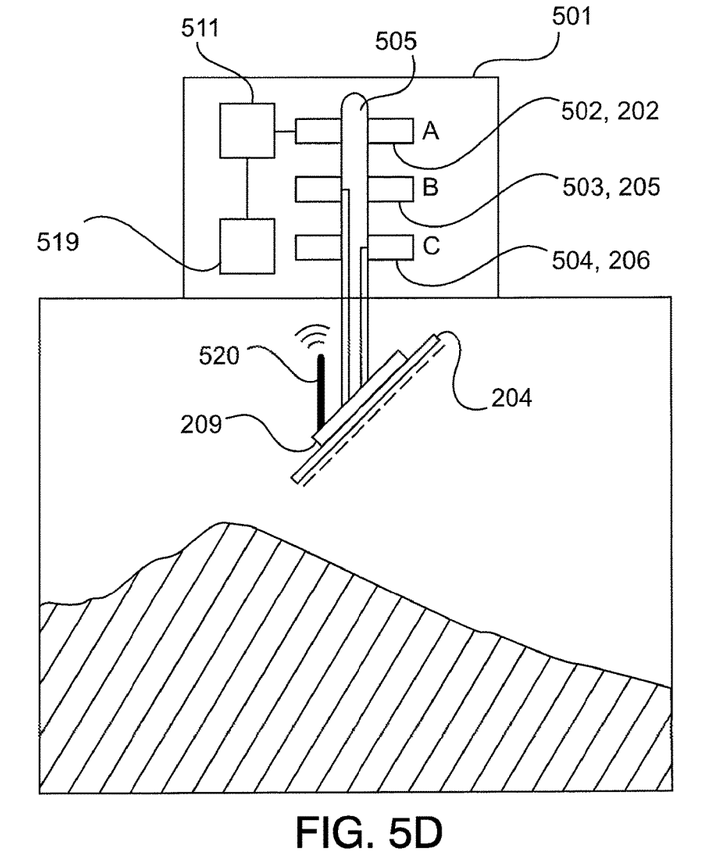
FIG. 5D shows a fill level measuring device according to another embodiment of the invention.

FIG. 5D shows a further integrated embodiment of a measurement device. In the shown design, the function of the electrical drive mechanism 202, 502 of the power supply 205, 503 of the high-frequency and signal processing unit 209 and of the rotary encoder 206, 504 is performed on a single rotational shaft 505.

The sectional view of FIG. 5A shows the electric drive mechanism 202 in more detail. The stator windings 509 around the rotor are supplied with voltages by suitable actuation of the control unit 511, for example a servo controller having an integrated vector actuation, such that a resulting magnetic field is generated which moves around the axis of rotation.

The rotor 510 can contain permanent magnets which move the rotor in a rotational movement along the external magnetic field. It is also possible to dispense with the permanent magnets in the rotor and to cause the rotor to rotate in accordance with the reluctance principle.

The sectional view of FIG. 5B shows in more detail the power generation unit 503 arranged below said rotor. A magnet 512, 513, preferably a permanent magnet, fastened in the stationary sensor part generates a stationary magnetic field. The armature 514 rotating in this magnetic field, and in this case in particular the armature winding 515 located thereon, undergoes a change in the magnetic field as a result of the rotation, and this results in an induction voltage being generated which can be used to power the high-frequency and processing unit 209.

The sectional view of FIG. 5C also shows in more detail the angle detection unit 504 attached to the rotational shaft 505. A current generated by the high-frequency and signal processing unit 209 flows through the sensor winding 516, and this generates a magnetic field. The current received by the coil 516 changes depending on the distance d 517 between the rotating magnet and the stationary metal 518. On account of this change, the high-frequency and signal processing unit 209 can come to a conclusion on the current angle of rotation.

Of course, in the present example, the electric drive mechanism and the rotary encoder can also be designed in accordance with any of the above-mentioned principles.

The measured values detected by the high-frequency and signal processing unit 209 can be transmitted easily by means of a digital close-range communications unit 520, for example using Bluetooth, WLAN or GSM or also using a similar cordless radio link. In this respect, the communication can be encrypted in order to prevent third parties from tapping or manipulating the measurement signals.

It is also possible to optically, electromagnetically or acoustically transmit data to the communications unit 519 inside the rotating tube (not shown).

Figure 6:
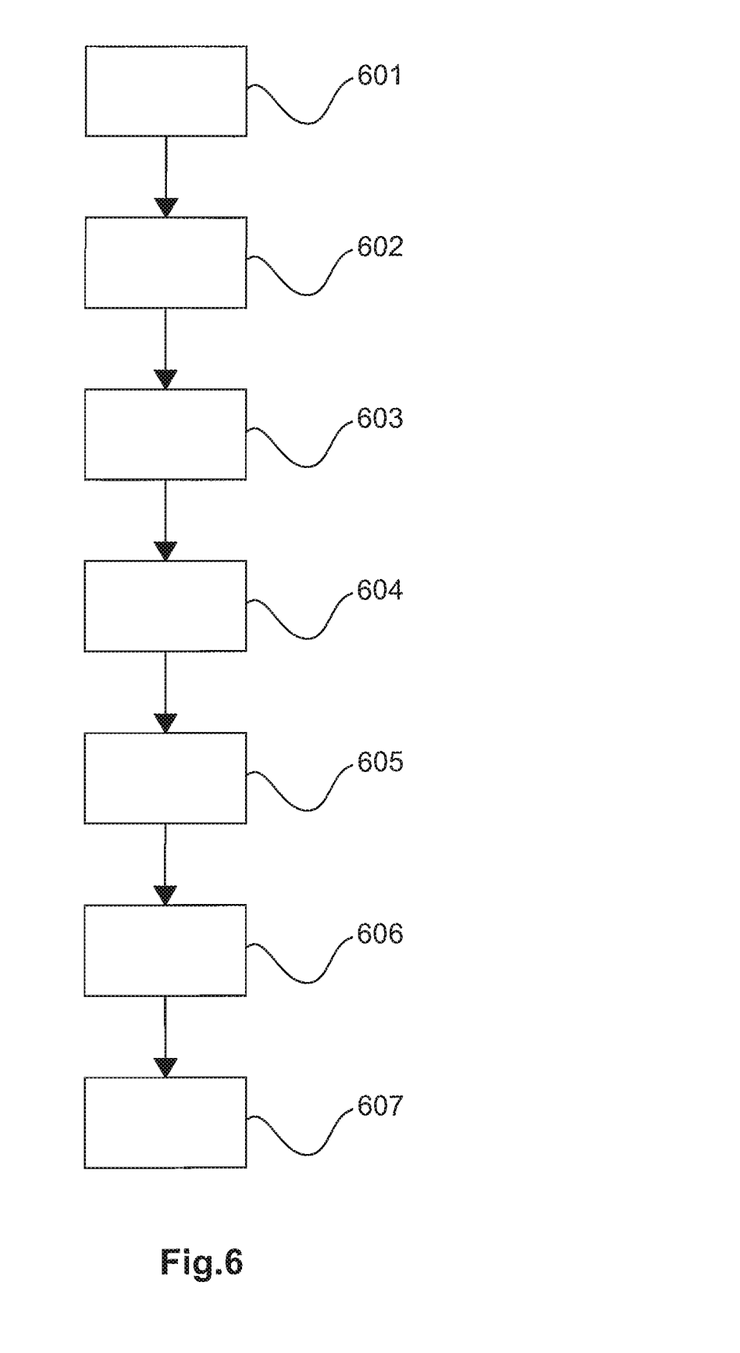
FIG. 6 is a flow diagram of a method according to one embodiment of the invention.

FIG. 6 is a flow diagram of a method according to an embodiment of the invention. In step 601, the antenna unit is supplied with the electrical power required for the measurement operation by means of a power supply and communications unit which is coupled to the antenna unit by means of a sliding contact or a pair of coils. In step 602, the antenna unit is caused to rotate, and, in step 603, the high-frequency and signal processing unit of the antenna unit, which rotates together with the antenna unit, generates a measurement signal which is then emitted in step 604 towards the filling material surface. This measurement signal is then reflected at least in part from the filling material surface and then, in step 605, is once again received by the antenna unit. In step 606, the received reflected signal is processed at least in part by means of the high-frequency and signal processing unit, after which, in step 607, said high-frequency and signal processing unit transmits the (pre) processed measurement signal to the power supply and communications unit, which can then perform further signal processing and the data obtained therefrom can then be transmitted to a remote central unit. A two-wire line may be provided for this purpose, which is connected to the fill level measurement device by means of a 4-20 mA interface.

For completeness, it is pointed out that the terms "comprising" and "having" do not exclude any other elements or steps and "a" or "one" does not exclude a plurality. It should also be noted that features or steps described with reference to one of the above embodiments may also be used in combination with other features or steps of other above-described embodiments. Reference numerals in the claims should not be treated as limiting.

The invention claimed is:

1. A radar fill level measurement device for determining a topology of a surface of a filling material or of a bulk material, comprising:
   a rotatable radar antenna comprising:
      an array of radiator elements configured to emit a measurement signal towards the surface and to receive a reflected measurement signal reflected from the surface, and
      a high-frequency signal processor configured to generate the measurement signal and to at least partially process the received reflected measurement signal; and
   a power supply and communications circuitry, coupled to the high-frequency signal processor by a sliding contact or a pair of coils, and configured to supply the high-frequency signal processor with electrical power for measurement operation,
   wherein the high-frequency signal processor is integrated in the rotatable radar antenna.

2. The radar fill level measurement device according to claim 1, further comprising:
   a power supply and communications interface configured to connect the power supply and communications circuitry to a two-wire line, to supply the fill level measurement device with electrical power for measurement operation, and to transmit measurement data to a remote controller.

3. The radar fill level measurement device according to claim 1, wherein the first pair of coils is a first stator-rotor pair of coils configured to wirelessly transmit the electrical power for operating the high-frequency signal processor from the power supply and communications circuitry to the high-frequency and signal processor.

4. The radar fill level measurement device according to claim 3, further comprising:
   a second stator-rotor pair of coils configured to wirelessly transmit measurement signals received by the rotatable radar antenna and processed by the high-frequency signal processor, from the high-frequency signal processor to the power supply and communications circuitry.

5. The radar fill level measurement device according to claim 1, further comprising:
   a rotary encoder configured to determine an angle of rotation of the rotatable radar antenna.

6. The radar fill level measurement device according to claim 1, further comprising:
   an electric motor configured to rotate the rotatable radar antenna during emitting of the measurement signal,
   wherein the sliding contact or the pair of coils, and the electric motor, are disposed on a common rotational shaft.

7. The radar fill level measurement device according to claim 1, further comprising:
   a wireless close-range communications apparatus attached to the high-frequency signal processor and configured to transmit measurement data generated by the high-frequency signal processor.

8. The radar fill level measurement device according to claim 1, wherein the sliding a contact or the pair of coils is configured to transmit power to the high-frequency signal processor and to transmit data from the high-frequency signal processor to the power supply and communications circuitry.

9. The radar fill level measurement device according to claim 1, the device being further configured to determine a viscosity and/or a density of a moving liquid.

10. The radar fill level measurement device according to claim 1, the device being further configured to determine a mass flow of a bulk material on a conveyor belt.

11. A method for determining a topology of a surface of a filling material or of a bulk material, comprising:
   supplying a rotatable radar antenna, which comprises an array of radiator elements, with electrical power for measurement operation by a power supply and communications circuitry, which is coupled to the rotatable radar antenna by a sliding contact or a pair of coils;
   rotating the rotatable radar antenna;
   generating a measurement signal by a high-frequency signal processor integrated in the rotatable radar antenna;
   emitting the measurement signal towards the surface, and/or receiving a reflected measurement signal reflected from the surface, by the array of radiator elements; and
   at least partially processing the received reflected measurement signal by the high-frequency signal processor.

* * * * *